Figure 1:
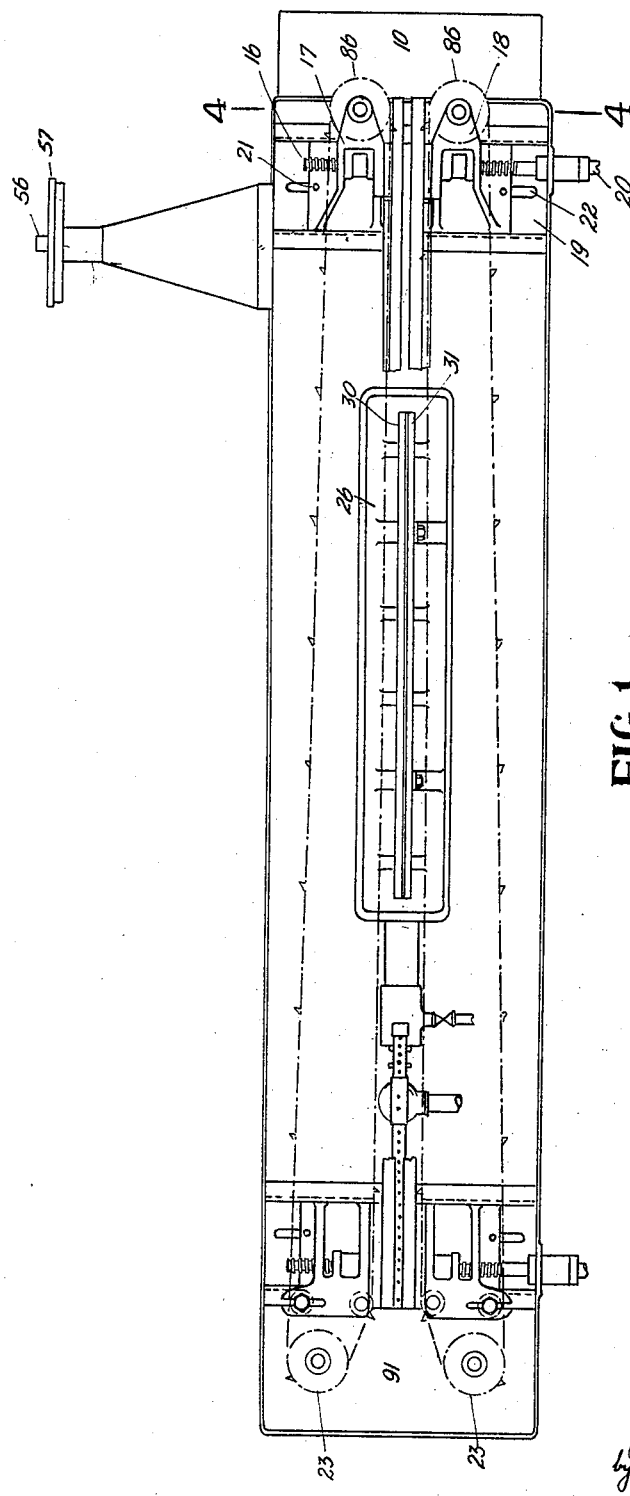

J. HEINE, Jr.
MACHINE FOR SOLDERING SEAMS OF CAN BODIES.
APPLICATION FILED JAN. 5, 1918.

1,318,871.    Patented Oct. 14, 1919.
6 SHEETS—SHEET 1.

Inventor
John Heine Jr.,
by Otto Munk
his Attorney

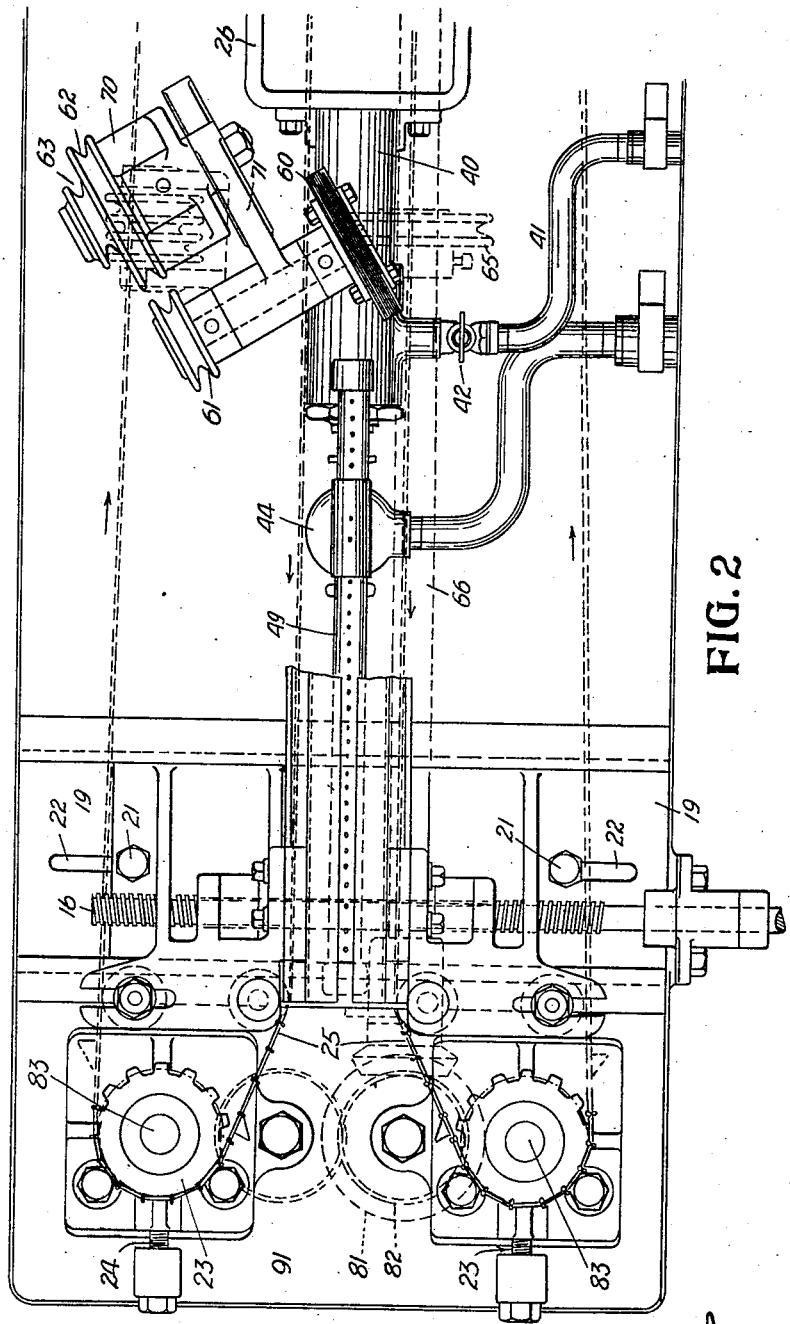

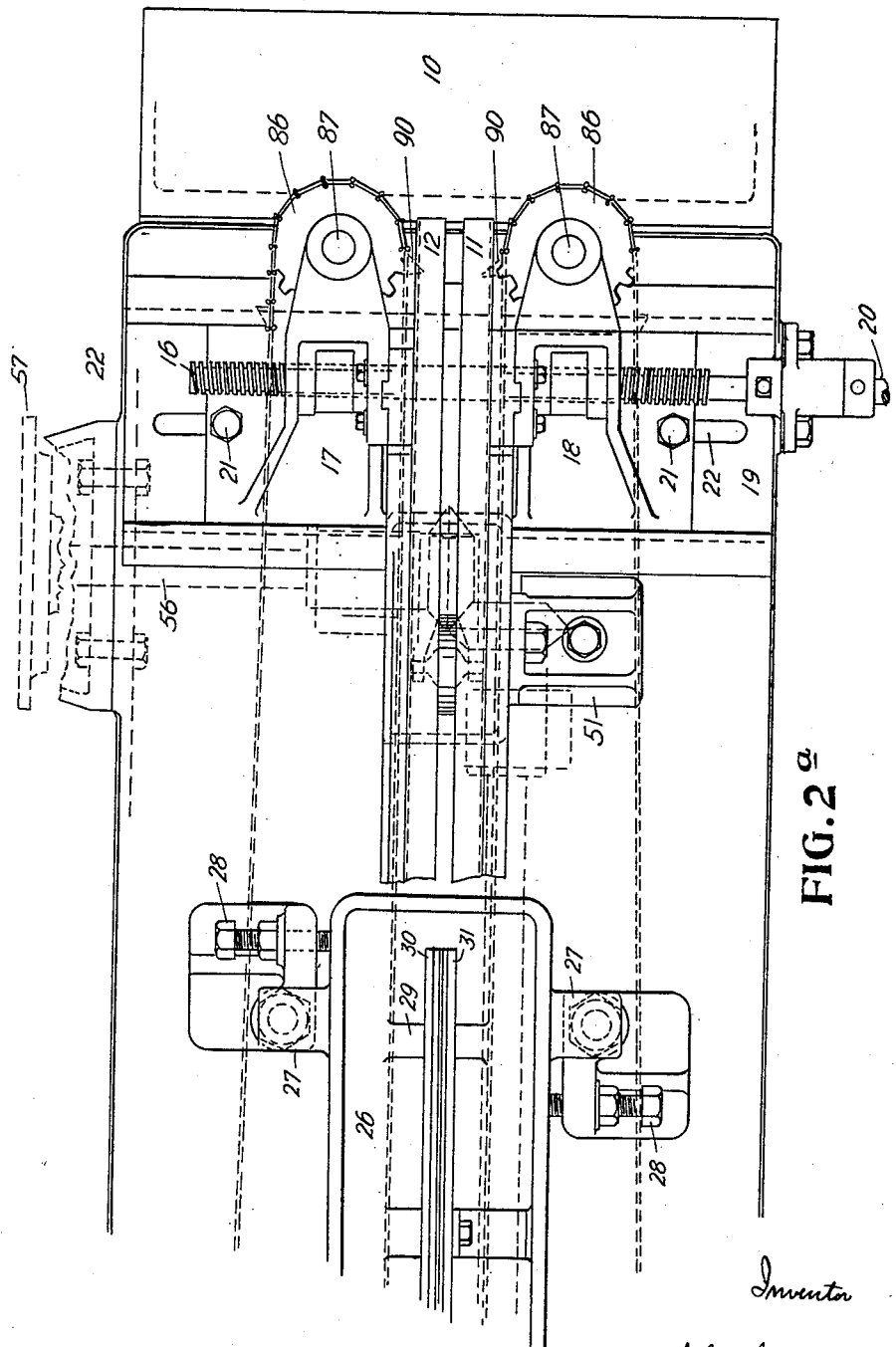

J. HEINE, Jr.
MACHINE FOR SOLDERING SEAMS OF CAN BODIES.
APPLICATION FILED JAN. 5, 1918.

1,318,871.

Patented Oct. 14, 1919.
6 SHEETS—SHEET 4.

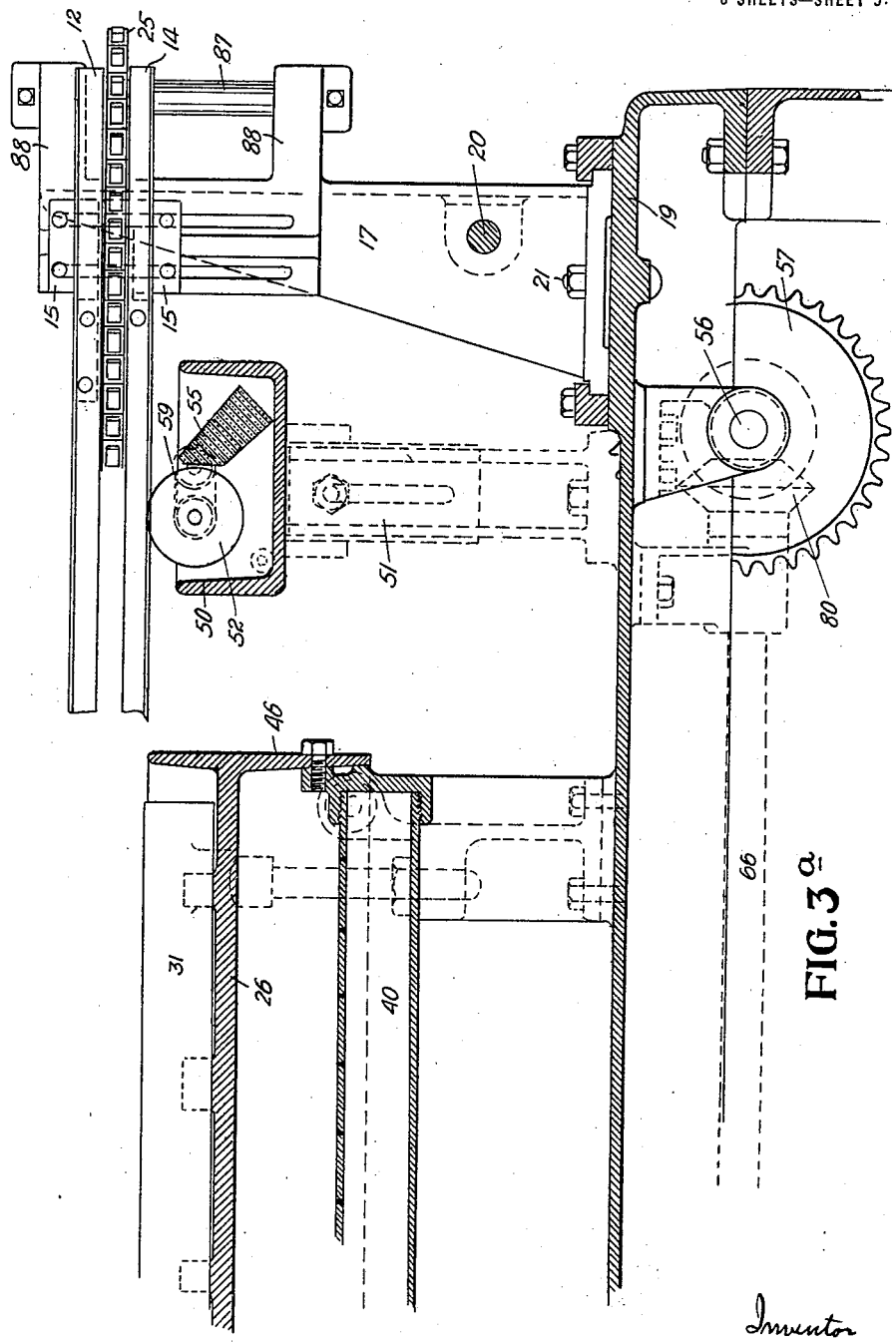

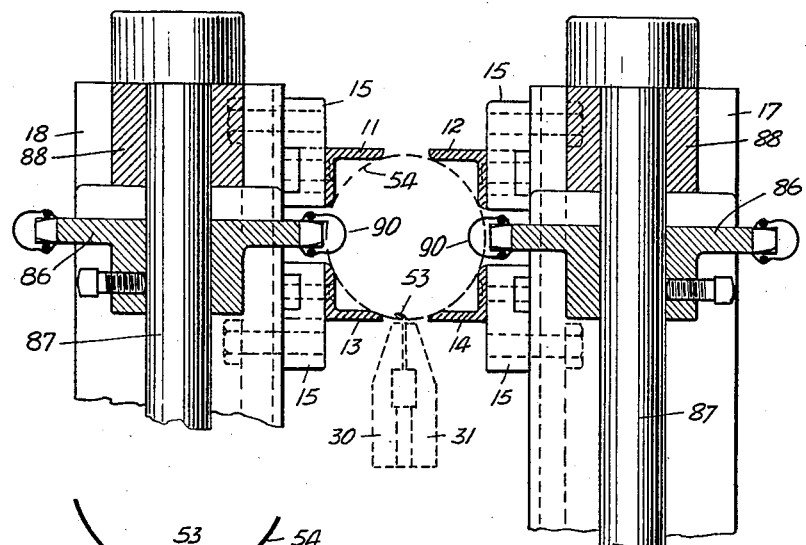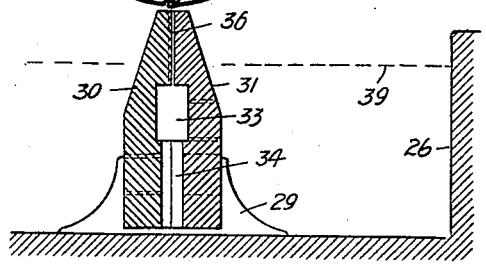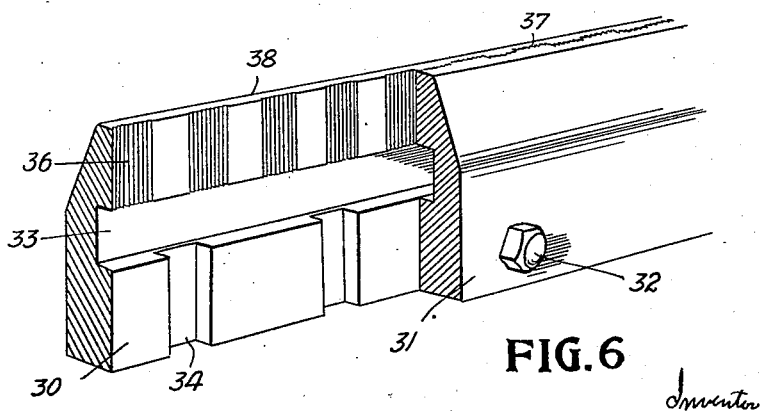

UNITED STATES PATENT OFFICE.

JOHN HEINE, JR., OF LEICHHARDT, NEAR SYDNEY, NEW SOUTH WALES, AUSTRALIA.

MACHINE FOR SOLDERING SEAMS OF CAN-BODIES.

1,318,871. Specification of Letters Patent. Patented Oct. 14, 1919.

Application filed January 5, 1918. Serial No. 210,443.

*To all whom it may concern:*

Be it known that I, JOHN HEINE, Jr., subject of the King of Great Britain and Ireland, residing at cr. Allen and Francis streets, Leichhardt, near Sydney, New South Wales, Australia, have invented new and useful Improvements in Machines for Soldering Seams of Can-Bodies, of which the following is a specification.

This invention has been devised with the object of superseding known types of can body seam soldering machines in which the seams are flooded with solder and finally sweated, or in which solder is applied to the seam and sweated into it by means of a rotating roller.

This invention is based on the principle of raising molten solder by capillary action from the solder bath to the seam, the solder being applied only in the requisite quantity to close the seam, and is sweated simultaneously with its application to the seam, and dry excess is finally wiped off. This method enables the seam soldering or sweating operation to be carried on with a continuous as contradistinguished from an intermittent movement of the can bodies through the soldering machine and in the case of side seams without imposing any rotational tendency on the can bodies by which the side seam would be removed from alinement with the soldering and sweating tools.

The solder feeding and sweating device consists of a bar divided lengthwise by a very narrow vertical slot and partially immersed in the molten solder bath, with the solder surface lever slightly below the slotted top of the bar. The solder flows up through the narrow slot in the bar by capillary action sufficiently rapidly to fill the seam. The can bodies are traversed over the bath with the seam to be closed rubbing or rolling on the top of the feed bar slot. Grippers or claws or other projections on a continuously moving endless chain are provided for traversing the can bodies for the purpose of closing the longitudinal seams therein, so that said seams are rubbed along the slotted feed bar, taking the solder therefrom, and suffering sweating in the rubbing contact.

In practice the capillary feed bar is formed of two bars bolted side to side. One or both of these bars is formed with pockets sunk in the lower part of it to offer free access for the molten solder, and one or both of them is scored from the pockets to the top edge either continuously or at intervals. The scorings form tubular passages of capillary dimensions when the two bars are bolted together. Alternatively, the capillary passage may be a very narrow slot formed by bolting the bars together, with thin spacing slips or wires inserted between them at intervals to hold them slightly apart.

The essential feature of the invention is the utilization of capillary action to raise the solder to the seams.

The accompanying drawings illustrate apparatus for carrying out the invention for the soldering of vertical seams of cylindrical can bodies.

Figure 3:
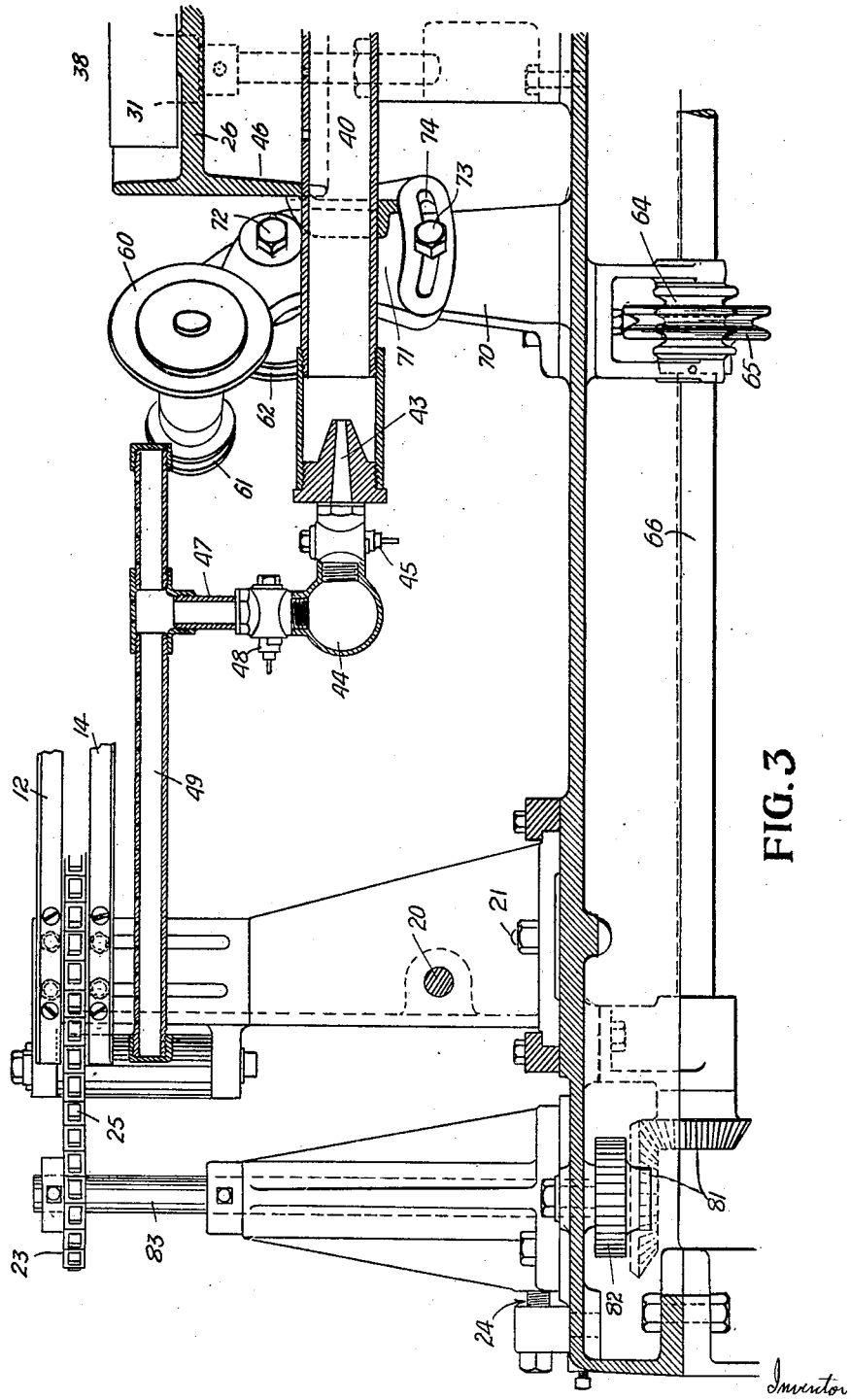

This form of the apparatus is modified structurally to adapt it for operating on circular rim seams. The detail of the circular seaming machines is not illustrated as the particulars of the longitudinal machines will suffice for the purpose of fully explaining the invention and offering sufficient information to enable a competent person to adapt the machine for circular seam work. Figure 1 is an incomplete plan of the machine, parts being shown in dotted lines and other parts being broken away for the purpose of facilitating explanation; Figs. 2 and 2A are detail plans on enlarged scale of the left hand end and right hand end of the machine respectively; Figs. 3 and 3A are corresponding vertical sectional elevations of the left hand end and right hand end of the machine; Fig. 4 is a transverse section on line 4—4 Fig. 1; Fig. 5 is a transverse fragment section through the solder bath and the solder feed bar therein, with the side seam of the can body passing over the slot in the feed bar; Fig. 6 is a perspective view of the feed bar, broken, to expose the interior form of the bar faces which form solder pockets, and the capillary orifices leading upward therefrom.

The can bodies are fed on to the table 10 into a race formed by the four angle bars 11, 12, 13 and 14 which are adjusted to the can body dimensions so that the can body may slide through this race while being held by it against loose rocking movement. The angle guides 11—14 are mounted on adjusting blocks 15 which are fixed to the base by bolts working in slots for the purpose of setting their vertical position apart. They are set laterally by a left and right hand traversing screw 16 which moves the brackets 17 and 18 toward or away from each other, said brackets being carried in a slide bed 19. The screw is operated by a hand crank fitted on the overhung end of the screw shaft 20. Pinching bolts 21 working through slots 22 in the bed 19 serve to fix the brackets when their lateral position has been adjusted. It will be noted that by the operation of the left and right hand screws 16, the brackets are always moved equal distances toward or away from center, so that center alinement is always preserved. At the left hand, or take-off end of the machine the construction is substantially identical, the differences in detail shown by the drawings not affecting the principle of the invention and being at once apparent. The sprockets 23 in the take-off bracket assembly are fitted with tension take-up screws 24 by which the tension of the feed chains 25 is adjusted after the lateral position of the brackets has been adjusted.

The solder bath consists of a cast iron pan 26 supported by carrier brackets 27 with a lateral screw adjustment 28, by operating which the center alinement of the pan 26 is set in correspondence with the center alinement of the body race 11—14. Supporting brackets 29 integral with the pan 26 carry the feed bar. This feed bar is constructed most conveniently and economically in the manner shown in Figs. 5 and 6, where it is shown to consist of two sections 30 and 31 secured together by through bolts 32. The central portion of the bar is cavitied as shown at 33 and slots 34 at intervals form openings from the bottom of the bar into the longitudinal cavity groove 33. The upper portion of the bar is very finely grooved as shown at 36; the grooves 36 alternating in the right and left hand sections as indicated at 37 so as to form in effect a continuous series of vertical grooves of capillary dimensions which connect the cavity 33 with the top face 28 of the bar when the two sections 30 and 31 are bolted tightly together. The bar sets snugly in the supporting brackets 29 which hold it erect in the manner shown in Fig. 5. The normal level of the solder surface is indicated at 39. It is found in practice that when a body of solder in the bath 26 is maintained liquid by heat the solder passes by capillary action upward through the fine grooves 36 and maintains a film on the body face 38 of the bar. The heating of the bath is effected by a gas burner tube 40 to which gas is supplied through a pipe 41 fitted with a valve 42, pressure air being supplied to this tube from a nozzle 43 from a manifold 44, 45 being an air control valve. The tube 40 is perforated or slotted on its top side to emit gas jets to play on the under side of the bath 26, a shroud 46 being fitted to inclose the space below the solder bath and thus economize heat. A connection 47 through the air manifold 44 is controlled by a valve 48 to apply air to a cool blast pipe 49 which is mounted in alinement with the soldering bar 30—31 but below the level of same with the object of playing air blasts on the sweated seam for the purpose of setting the sweated solder before the can body leaves the machine. At a point in the assembly preceding the solder receptacle 26 a flux holding receptacle 50 is mounted which contains a bath of hydrochloric acid, chlorid of zinc or other flux. This receptacle is mounted on a slotted slide standard 51 which permits vertical adjustment, the lateral adjustment being such that the flux applying wheel 52 is in alinement with the race 11—14 and consequently with the seam 53 of the can body 54 passing through the race. 55 is an adjustable wiper of any suitable kind well known in the art for removing excess flux from the wheel 52. The wheel 52 is maintained in rotation so as to rub on the seam and so apply flux thereto by means of a belt drive 59, the primary motion coming from the main shaft 56 by a belt (not shown) to the driver wheel, over which the belt 59 is carried; power is supplied through a sprocket wheel 57 or a belt pulley.

Rearward of the solder bath 26 a wiper wheel 60 is mounted in angular relation to the center line of the machine and adjusted so that it will rub on the sweated seam immediately after the can body leaves the bath and before it reaches the cooling air blast, with the object of smoothing off and finishing the seam. This wheel is a disk wheel made of appropriate substance for the seam finishing process. It is maintained in rotation so as to rub the seam by means of belt gearing to the pulley 62 and thence to the pulley 61, the pulley 62 being driven by a belt connection from the step 63 via the idler wheel 64 to belt wheel 65 on the longitudinal shaft 66. Angular and tipping adjustment of the wheel 60 is effected by the rotary and rocking standard mounting shown in Figs. 2 and 3, angular adjustment being effected by turning the bracket foot 70 on its body, said foot having slots (not shown) through which the bolts for holding down the bracket pass, and tipping adjustment by canting the bracket arm 71 and securing it by the pinching bolt 73 which works through an arcuate slot 74.

The longitudinal shaft 66 derives motion from the transverse shaft 56 by intermediate bevel gearing 80 which transfers motion therefrom to the bevel gear train 81 and the sprocket gear train 82 to the spindles 83 of the sprocket wheels 23. These sprocket wheels drive the feed chains 25. At the forward end these chains pass around idler sprockets 86, the spindles 87 of which are carried in the bearings 88 of the brackets 17. The direction of rotation of the chain is indicated by arrows in Fig. 2. As previously described, the distances between the chains is determined by the setting of the brackets 17 by means of the right and left hand adjusting screws. The chains are fitted with claws 90 at intervals. These claws operate to push the can bodies 54 through the race 11—14 carrying the bodies 54 at a uniform rate of progress along the soldering bar 30—31 and in rubbing contact therewith, and thence over the cold air blast service 49 where the sweated seam is set. The seamed bodies are finally ejected from the race 11—14 on to the take-off table 91.

This system of sweating or soldering can seams facilitates rapid and clean work, and effects a substantial saving in flux and solder.

What I claim as my invention and desire to secure by Letters Patent is:—

1. In a machine for soldering the seams of can bodies, the combination with a receptacle containing a bath of solder, of a soldering iron having its greater portion immersed in the solder and provided with capillary passages straight throughout their extent, whereby the solder will form a film on the discharge ends of the capillary passages, and means for feeding can bodies through the machine with their seams in rubbing contact with the discharge ends of the capillary passages.

2. In a machine for soldering the seams of can bodies, the combination with a receptacle containing a bath of solder, of a soldering iron having its greater portion immersed in the solder and provided with a plurality of relatively short vertical capillary passages, whereby the solder will form a film on the discharge ends of the capillary passages, and means for feeding can bodies through the machine with their seams in rubbing contact with the discharge ends of the capillary passages.

3. A soldering iron having its greater position immersed in a bath of solder and provided with an elongated internal solder receiving cavity and a plurality of capillary passages straight throughout their length extending from said cavity to the solder applying face of the bar, whereby the solder will form a film on the discharge ends of the capillary passages.

4. A soldering iron having an internal cavity extending lengthwise thereof, spaced slots at one side of said cavity for the passage of solder to the cavity, and a plurality of capillary passages at the other side of said cavity to remove solder therefrom.

5. A soldering iron comprising a pair of juxtaposed plates having a substantially central cavity extending lengthwise therethrough, capillary passages leading from the cavity to the soldering face of the bar, and slots leading from the cavity to the foot of the bar.

In testimony whereof I have signed my name to this specification in the presence of two subscribing witnesses.

JOHN HEINE, Jr.

Witnesses:
W. J. HUMPHREYS,
H. C. CAMPBELL.

Copies of this patent may be obtained for five cents each, by addressing the "Commissioner of Patents, Washington, D. C."